3,530,199
ETHYLENE PRODUCTION PROCESS
Edgar G. Lowrance, Dedham, Mass., assignor to Stone & Webster Engineering Corporation, Boston, Mass., a corporation of Massachusetts
Filed June 22, 1967, Ser. No. 648,035
Int. Cl. C07c 11/02, 11/24
U.S. Cl. 260—683　　　　　　　　　　　　　10 Claims

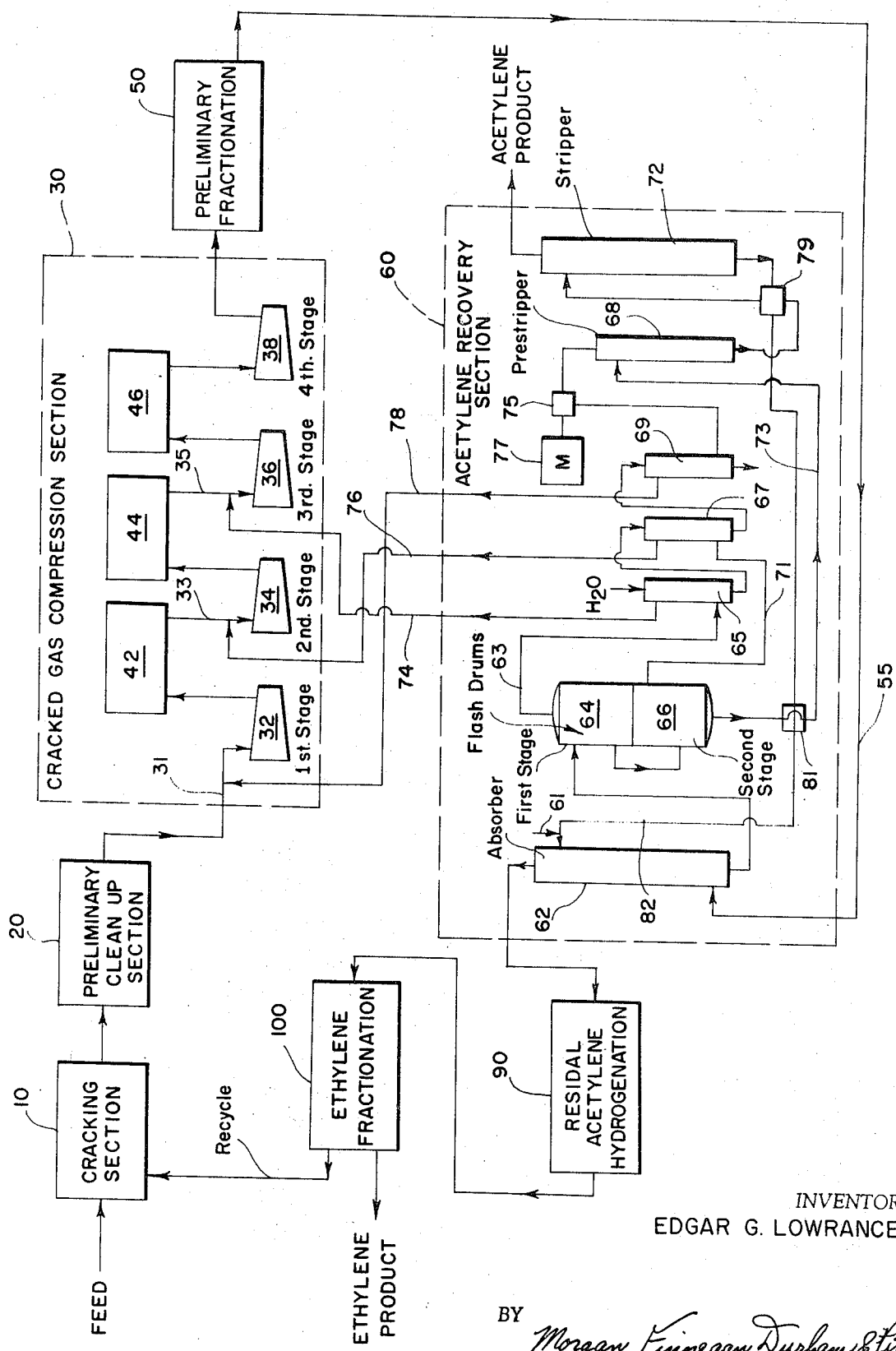

ABSTRACT OF THE DISCLOSURE

An ethylene production process is provided which allows the recovery of a pure acetylene byproduct. Hydrocarbons are cracked, compressed in a multistage compression section, fractionated, treated in a solvent absorber for removal of acetylene and then subjected to final fractionation for separation of the ethylene product. The acetylene removed in the absorber is purified by a series of flash evaporation steps, a prestripping step and a final stripping step, to provide a pure acetylene byproduct. The ethylene impurities separated from the acetylene in the flash evaporation steps are recycled to the compression stages of the ethylene production process.

---

This application relates to a process for the production of ethylene by hydrocarbon cracking. More particularly, it relates to a process for the production of ethylene which includes an improved method for removing acetylene impurities from the ethylene product to produce both a purified ethylene product and a purified acetylene byproduct.

In the production of ethylene by the high temperature thermal cracking of hydrocarbons such as ethane, propane, butane, pentane, naphtha, gas oil and the like, acetylene is generally produced as a minor byproduct. It is usually necessary to remove this acetylene from the ethylene product in order to meet commercial ethylene purity requirements, since the presence of acetylene in the ethylene product, even in small amounts, can be harmful in subsequent use of the ethylene. For example, ethylene which is to be polymerized to prepare polyethylene plastics must be essentially acetylene-free. Further, ethylene which is to be reacted with other chemicals, such as benzene, in the presence of certain metal halide catalysts must be free of acetylene, since acetylene can act as a poison toward such catalysts.

It has heretofore been proposed to remove acetylene from the ethylene product of cracking processes both by hydrogenation and by absorption in a selection solvent. Both of these procedures are presently in use commercially, and both are satisfactory for achieving desired high levels of acetylene removal. While the hydrogenation procedure requires a lower capital outlay for equipment, it has the disadvantages of destroying a portion of the ethylene product (by converting it to ethane) and of completely destroying the acetylene byproduct.

The solvent absorption procedure has the advantage of recovering the acetylene byproduct without any measurable destruction of product ethylene. The only major disadvantage of such absorption procedures lies in the high capital outlay required for the equipment necessary to carry them out on a commercial scale.

Conventional prior art equipment for the separation of byproduct acetylene from the ethylene product of hydrocarbon cracking has included absorbers for contacting the ethylene-acetylene mixture with a solvent which is selective for acetylene, and strippers for separating the acetylene byproduct from the solvent. Various types of additional separating equipment are generally used along with the absorber and the stripper, to separate residual ethylene from the acetylene-solvent solution.

Extreme care must be exercised in the operation of these residual ethylene separators because the residual ethylene streams generally contain substantial amounts of acetylene, and the handling of such concentrated acetylene streams is both difficult and hazardous. Concentrated acetylene mixtures can be safely handled only at low pressures and relatively low temperatures. For these reasons, particularly cumbersome equipment requirements have been necessary in handling the residual ethylene streams. Thus, before such residual ethylene can be recycled to the high pressure solvent absorber for further treatment, it is necessary in the prior art procedures to pass it though complex and expensive coolers, absorbers, separators and compressors.

Accordingly, and in view of the foregoing problems in prior art ethylene production procedures, it is a primary object of this invention to provide an improved ethylene production process which produces both a purified ethylene product and a purified acetylene byproduct in a much more econmical manner than has been heretofore possible, and at greatly reduced requirements of capital outlay for processing equipment.

Another object of this invention is to provide an ethylene production process which includes an improved step for the removal of acetylene from the ethylene product and which eliminates the need for much of the costly equipment heretofore used in such absorption treatment procedures.

Still another object of this invention is to provide an improved process for the production of ethylene, including an improved step for the removal of byproduct acetylene in a purified form from the ethylene product by solvent absorption, which acetylene removal step allows residual ethylene in the acetylene-solvent absorber bottoms to be removed by conventional techniques, without the need for special cooling, absorbing, separating and compressing units.

It is a further object of this invention to provide an improved process for the production of ethylene, which provides an ethylene-acetylene separation procedure than can be integrated into the overall ethylene production process to achieve more economical production of both the ethylene product and a purified acetylene byproduct.

Additional objects and advantages of the invention will be set forth in part in the description which follows, and in part will be obvious from the description, or may be learned by practice of the invention, the objects and advantages being realized and attained by means of the methods, processes, improvements and combinations particularly pointed out in the appended claims.

To achieve the foregoing objects and in accordance with its purpose, as embodied and broadly described, the present invention provides an improvement in a process for the production of ethylene by hydrocarbon cracking. This process comprises cracking a hydrocarbon gas; compressing the cracked gas products in at least two stages of compression, with the pressure being increased in each of the succeeding stages of compression; fractionating the compressed, cracked gases to separate a fraction comprising a major portion of ethylene and a minor portion of acetylene; and separating the acetylene from the ethylene to produce a purified ethylene product and a purified acetylene byproduct. The improvement provided by the present invention comprises separating the acetylene from the ethylene by:

(a) Bringing a selective solvent into intimate contact with the ethylene-acetylene mixture at an elevated pressure to dissolve and remove substantially all of the acetylene from the ethylene-acetylene mixture in an acetylene-solvent solution containing a minor amount of ethylene as an impurity;

(b) Removing the ethylene impurity from the acetylene-solvent solution, by subjecting the solution to at least two stages of flash evaporation, the pressure on the acetylene-solvent solution being reduced in each succeeding flash stage, with the pressure applied to the solution in the last stage of flash evaporation being at least as great as the entry pressure of one of the stages of compression of the cracked hydrocarbon gases in the compression step of ethylene production process;

(c) Stripping acetylene from the ethylene-free acetylene-solvent solution, isolating the purified acetylene, and recycling the substantially pure solvent residue from the stripping step to the acetylene-absorption step of the process; and (d) Mixing the flashed ethylene from each stage of flash evaporation with the cracked hydrocarbon gas stream in the compression step of the ethylene process.

In a preferred embodiment of the present process, the acetylene-solvent solution leaving the last stage of flash evaporation is treated for the further removal of ethylene impurities prior to the stripping of the acetylene from the solution. This further ethylene removal is effected by contacting the solution at about atmospheric pressure with sufficient heat or pure acetylene to prestrip any residual ethylene from the solution as a gas. The ethylene so removed is compressed and passed to the compression step of the ethylene production process.

The invention consists in the novel methods, processes, steps, combinations and improvements shown and described. The accompanying drawing which is incorporated in and constitutes a part of this specification, illustrates one embodiment of the invention, and together with the description, serves to explain the principles of the invention.

The drawing is a schematic diagram of the process of the present invention, showing the effective integration of the improved acetylene removal step of the invention in a complete ethylene production process.

It is to be understood that both the foregoing general description and the following detailed description are exemplary and explanatory, but are not restrictive of the invention.

Reference will now be made in detail to the present preferred embodiment of the invention, an example of which is illustrated in the accompanying drawing.

As shown in the drawing, the hydrocarbon feed is initially passed to a cracking section of the ethylene plant. This feed stock can comprise ethane, propane, butane, pentane, naphtha, gas oil or mixtures of these hydrocarbons, and thus for example can comprise about 97 mol percent of ethane and 3 mol percent of methane and propane; or it can comprise about 90% by weight of propane, 2% by weight of ethane and 8% by weight of butane. Either of these feed stocks can contain minor amounts of impurities such as sulphur, water and nitrogen. These impurities are present in only about trace amounts. It is generally desired to convert these feed stocks to products which contain a minimum of 99.9% by weight of ethylene, and contain less than 5 p.p.m. by weight of acetylene.

Pressurized hydrocarbon vapors are generally passed to the cracking furnace at ambient temperatures, and are heated in these furnaces at highly elevated temperatures, above about 800° C., with superheated steam to achieve the desired cracking. The procedures for cracking either predominantly ethane or predominantly propane hydrocarbons are well known to those skilled in the art.

The cracked hydrocarbon gases exiting cracking section 10 are preferably cooled immediately on exiting the cracking furnaces in a transfer line heat exchanger. This immediate cooling ensures the production of a cracked product having a high ethylene content.

The cooled, cracked hydrocarbon then enters a preliminary cleanup section 20 where it is further cooled and subjected to primary fractionation to remove heavy hydrocarbons. In cleanup section 20 the cracked gas stream is passed through a countercurrent water reflux which condenses the heavy hydrocarbons and removes them from the bottom of the water tower. The uncondensed gas exits cleanup section 20 as an overhead stream and flows to first stage 32 of cracked gas compression section 30 through a knock-out drum (not shown) which removes any entrained liquid.

The cracked gas stream is compressed in stages to a very high pressure in compressor section 30. This compression acts to condense additional longer chain hydrocarbons, and to further purify the ethylene stream. It is preferred to carry out this compression in at least four stages, as shown in the accompanying drawings, and to increase the pressure applied to the cracked gas stream in each stage. Thus, for example, first stage compressor 32 may compress and the gas stream from about 25 p.s.i.a. to about 50 p.s.i.a. second stage compressor 34 may further compress the gas from about 50 p.s.i.a. to about 100 p.s.i.a.; third stage compressor 36 may further compress the gas from about 100 p.s.i.a. to about 200 p.s.i.a.; and the fourth stage compressor 38 may further compress the gas stream to 400 p.s.i.a. or higher.

Separators 42, 44, and 46, interposed between the compression stages, cool and separate condensed hydrocarbons and water from the cracked gas stream. One of these separators, preferably final separator 46, can be provided with a caustic scrubber for the removal of acidic constituents from the gas stream by absorption, if desired.

The cracked hydrocarbon gas stream exiting fourth stage 38 of compression section 30 is cooled and dried by suitable equipment (not shown), and passed to the preliminary fractionation section 50 of the ethylene production plant. In preliminary fractionation section 50, the primary ethylene fraction of the cracked hydrocarbon gas stream is separated by conventional fractionation techniques from methane and hydrogen, which are first separated as an overhead vapor, and then from propylene and heavier hydrocarbons, from which the ethylene is removed as an overhead vapor. The ethylene stream exiting preliminary fractionation section 50 contains minor amounts of ethane and acetylene impurities.

Acetylene recovery section 60 separates the acetylene impurities from this ethylene stream. Section 60 comprises: (1) absorber 62 in which the primary ethylene-acetylene separation is effected by counter-current solvent absorption; (2) flash drums 64 and 66 and prestripper 68 which purify the acetylene byproduct by evaporation and removal of residual ethylene from the acetylene-solvent solution; and (3) heat stripper 72 which strips a purified acetylene byproduct from the solvent absorbent. Water washers 65, 67 and 69 wash the flashed ethylene streams from flash drums 64 and 66 and prestripper 68, respectively, to remove minor amounts of vaporized solvent in these streams before they are returned to the compression section 30 of the plant (by transport lines 74, 76 and 78) for recycle through the system.

The ethylene overhead stream exiting absorber column 62 is passed to residual acetylene hydrogenation section 90 where it is contacted with high purity hydrogen in the presence of a highly selective catalyst for the hydrogenation of acetylene. Hydrogenation section 90 thus removes any residual acetylene impurities in the overhead ethylene stream exiting absorber 62.

The acetylene-free ethylene stream then passes from hydrogenation section 90 to ethylene fractionation section 100 in which the purified ethylene product is separated from any methane introduced into the product stream with the hydrogen in hydrogenation section 90, and also from the ethane impurity in the ethylene stream. The methane is first removed as an overhead vapor from the liquid ethylene-ethane mixture, and the ethylene is then separated from the liquid ethane which is removed as a bottom fraction from ethylene fractionation section 100.

In operation of the improved acetylene removal step of the present process, as illustrated in the attached drawing, the ethylene-acetylene gas stream from preliminary fraction section 50 is introduced into absorber 62 near its bottom through conduit 55. This gas stream is passed up through absorber 62 where it is brought into intimate counter-current contact with a descending stream of a suitable solvent which selectively absorbs acetylene from the gas streams.

The solvent is introduced into absorber 62 near its top through conduit 62. The preferred solvent is dimethyl formamide. Other suitable solvents include acetone; butyrolacetone; dialkylacetamides and tetra-alkyl ureas of the type described in U.S. Pat. 2,146,448; and carbonic acid esters, liquid aliphatic ketones, polyglycols, polyglycol ethers and esters, and lactones, of the type described in U.S. Pat. 2,762,453.

The solvent is preferably presaturated with ethylene vapor and chilled to about −15° C. or less in a cooler using a high level refrigerant, such as propane, porpylene, ammonia or the like to ensure selective absorption of acetylene. The use of ethylene vapor as the saturant and the subsequent cooling with liquid propylene or the like is preferred over the use of a liquid ethylene saturant, because of the much lower cost of the preferred method. The more expensive liquid ethylene saturation procedure can of course be used, if desired.

The purified ethylene overhead from absorption tower 62 contains a minor amount of entrained solvent, which is present as a vapor or mist in the gas stream. The solvent is removed by washing the gas stream with a suitable solvent such as liquid ethylene, either in a few trays at the top of tower 62, or in a separate washing vessel (not shown).

The solvent-free ethylene overhead stream is then passed to residual hydrogenation section 90, which can be a very low capacity unit designed to act primarily as a guard to remove the virtually neglible amounts of acetylene that may (or may not) be present in the ethylene after solvent absorption in absorber 62. The hydrogenated ethylene stream passes through final ethylene fractionation section 100 where purified ethylene is separated from minor amounts of methane and ethane impurities. These separated impurities are then recycled to cracking section 10 or to compression section 30.

The acetylene-rich solvent, preferably dimethyl formamide, removed from the bottom of absorber 62 is passed to a series of flash vessels 64 and 66, which operate at pressures corresponding to and slightly greater than the pressures to which the cracked hydrocarbon gases are subjected in various stages of compression in compression section 30. In a preferred embodiment of the present process, there are at least three (3) stages of compression of the cracked hydrocarbon gases in compression section 30, and two stages of flash evaporation, such as those provided by flash drums 64 and 66 in the embodiment shown in the drawing.

The pressure applied to the solvent-acetylene mixture is reduced in each successive flash drum to flash evaporate residual ethylene impurities in the solvent-acetylene mixture. The use of multiple flash drums reduces the amount of acetylene which flashes off with the ethylene impurities, and this reduction in the acetylene content of the overhead from flash drums 64 and 66, together with the provision in the present process for the return of the flashed ethylene to the compression section 30 of the plant reduces the overall cost of plant equipment in accordance with the objects of the present invention.

Thus, a typical ethylene plant normally contains an acetylene hydrogenation unit consisting of three catalyst vessels, and incident heat exchangers and catalyst regeneration facilities. Plants utilizing acetylene absorption separation techniques generally must provide individual coolers, acetylene absorption units, and compressors which operate in conjunction with each flash unit of the residual ethylene separation system. In the present process, however, all of this expensive equipment is eliminated, with the mere provision of return lines 74 and 76 for transport of the overhead ethylene from flash drums 64 and 66 to compression section 30 of the ethylene plant.

In operation of the flash drum, the high pressure solvent acetylene mixture, which is generally under a pressure in excess of 300 p.s.i.a. in absorber 62, enters flash drum 64 where the pressure is preferably reduced to that corresponding to the entry pressure of third stage 36 of compression section 30—for example, a pressure slightly in excess of 100 p.s.i.a. Residual ethylene, along with some acetylene is flash evaporated by this reduction in pressure and passes through overhead line 63 to water washer 65.

In washer 65 the ethylene-acetylene stream is brought into countercurrent contact with a water stream to remove vaporized or entrained solvent from the gas stream. The solvent-containing washings are preferably sent to the next washer stage 67 to wash the flashed gases, thus minimizing water requirements and reducing solvent losses. The solvent-free ethylene-acetylene overhead from washer 65 is then passed through conduit 74 to conduit 35 which leads into third stage 36 of compression section 30. Since the pressure in flash drum 64 is slightly greater than the entry pressure of third stage compressor 36, for example about 107 p.s.i.a. to 100 p.s.i.a. the ethylene overhead from the flash drum is readily returned to third stage compressor 36.

The liquid bottoms from flash drum 64 are passed to flash drum 66, where the presure is further reduced, for example to slightly in excess of 50 p.s.i.a. This additional pressure reduction flashes more residual ethylene impurities, again containing a minor amount of acetylene. This flashed vapor stream passes through overhead line 71 through water washer 67, and then through conduit 76 to entry conduit 33 and into second stage compressor 34 of compression section 30. Second stage compressor 34 is operated on an entry pressure slightly lower than the pressure maintained in flash drum 66, to facilitate passage of the flash overhead from drum 66 to compressor 34.

The solvent-acetylene bottoms from flash drum 66 are passed through conduit 73 to prestripper 68, where the remaining ethylene residue is removed from the solution by atmospheric pressure stripping. Either pure acetylene or external heat, or both are supplied to the bottom of prestripper 68 by any suitable means (not shown) to cause the remaining ethylene to be stripped in gaseous form from the acetylene-rich solvent solution.

It is preferred to carry out this prestripping by heating the acetylene-solvent solution at about atmospheric pressure while concurrently adding pure acetylene to prestripper 68. The ethylene-acetylene overhead from prestripper 68 is pressurized in blower 75, operated by motor 77, to a pressure greater than the operating pressure of first stage compressor 32 of compression section 30. Thus, for example, blower 75 can compress the overhead from prestripper 68 to a pressure slightly in excess of 25 p.s.i.a., when compressor 32 is operating at an entry pressure slightly less than 25 p.s.i.a. The compressed overhead stream from prestripper 68 is then passed through water washer 69 and conduit 78 to conduit 31, and then into first stage 32 of compression section 30.

It should be noted that the process of this invention, as embodied and described, provides for mixing the low pressure recycled streams from flash drums 64 and 66 and prestripper 68 with large volumes of cracked hydrocarbon gases in conduits 31, 33 and 35 prior to the recompression of these overhead ethylene streams. This preblending, prior to recompression, avoids the hazards of handling high concentrations of acetylene at high pressures, and thus adds an important safety factor to the process of the present invention.

The present process, in its preferred form, provides for the recycling of the ethylene overhead from each of the flash drums and the prestripper to different stages of the compression section of the ethylene plant, which operate, respectively, at entry pressures slightly lower than the flash pressure in the corresponding flash drum or prestripper. It is to be appreciated, however, that the overhead vapor streams from each flash drum and from the prestripper can all be returned to a single point of entry into compression section 30 or to any desired number of points in the compression section. The only requirement is that the flash pressure must be at least as great, and preferably greater, than the entry pressure at the point in the compression section where the flashed gas streams begins its recycle.

The acetylene-rich solvent solution, free of ethylene, passes from prestripper 68 to stripper 72 where the acetylene is stripped out from the solvent by heat and sent to storage or consuming units. Part of this purified acetylene can be recycled to prestripper 68.

The lean solvent removed from the bottom of stripper 72 and to prestripper 68 is heat exchangers 79 and 81, cooled to about −15° C. or less by an external cooling medium in a suitable heat exchanger (not shown) and then returned to absorber 62 through conduit 82 to repeat the absorption cycle. The recycled absorber solution in conduit 82 is mixed with fresh makeup absorber solution being introduced to absorber 62 through conduit 61.

For a clearer understanding of the invention, a specific example of it is set forth below. This example is merely illustrative and is not to be understood as limiting the scope and underlying principles of the invention in any way. All parts and percentages referred to herein are by weight unless otherwise specifically indicated.

EXAMPLE

In this example, an ethylene production process is carried out using the system illustrated in the accompanying drawing. The hydrocarbon stream fed to the cracking section is a light naphtha and has the following composition:

N-paraffins—75.7%
Iso-paraffins—16.2%
$C_5$'s—7.0%
$C_6$'s—1.0%
Aromatics—0.1%
Total sulphur—23.0 p.p.m.

This hydrocarbon stream is vaporized and cracked, subjected to preliminary clean up, and then compressed in four (4) stages, the entry pressure to the first stage compressor being 23 p.s.i.a., to the seocnd stage compressor being 47 p.s.i.a. and to the third stage compressor being 100 p.s.i.a. The fourth stage compressor pressurizes the cracked gases to a final pressure of about 33 bars (about 480 p.s.i.a.), at which pressure the cracked gases are passed into the preliminary fractionation section.

In this example, the absorber column is operated at a pressure of 348 p.s.i.a. and a temperature of 0° F.; the first flash drum is operated at a pressure of 107 p.s.i.a. and a temperature of 0° F.; and the second and final flash drum is operated at a pressure of 53 p.s.i.a. and a temperature of 0° F. The prestripper is operated at a temperature of 25° F. and at a pressure of 15 p.s.i.a.—at about atmospheric pressure. The overhead stream from the prestripper is compressed to 26 p.s.i.a. in the blower for transport to the first stage of the compression section.

The stripper is operated at a temperature of 325° F. and a pressure of 21 p.s.i.a., and uses 265 p.s.i.a. steam as its heating medium.

An overall material balance is carried out by measuring and analyzing the feed and product streams to and from each piece of equipment in the acetylene recovery section operating in the foregoing manner. The material balance is set forth in Table 1, below. All amounts are in mols per hour.

TABLE 1

| Streams | Absorber feed | Absorber overhead | Lean DMF | Absorber bottoms | 1st stage flash vapor | 1st stage flash liquid | 2nd stage flash vapor | 2nd stage flash liquid | Prestrip overhead | Prestrip bottoms | Stripping acetylene | Acetylene product |
|---|---|---|---|---|---|---|---|---|---|---|---|---|
| Methane | 1.90 | 1.90 | | | | | | | | | | |
| Acetylene | 15.85 | 0.15 | | 15.70 | 1.45 | 14.25 | 0.41 | 13.84 | 1.39 | 28.96 | 16.51 | 12.45 |
| Ethylene | 1,397.20 | 1,338.54 | | 58.66 | 43.95 | 14.71 | 7.22 | 7.49 | 7.44 | 0.11 | 0.06 | .05 |
| Ethane | 303.93 | 297.20 | | 6.78 | 5.75 | 1.03 | 0.65 | 0.38 | .38 | | | |
| Propylene | 5.01 | 4.90 | | 0.11 | 0.09 | .02 | 0.02 | | | | | |
| DMF | | | 135.00 | 135.00 | | 135.00 | | 135.00 | | 135.00 | | |
| Total, mols/hr | 1,723.94 | 1,642.69 | 135.00 | 216.25 | 51.24 | 165.01 | 8.30 | 156.71 | 9.21 | 164.07 | 16.57 | 13.50 |

The foregoing material balance shows that the feed to the absorber is predominantly ethylene, containing about 15 mol percent ethane, and substantially lesser amounts of methane, acetylene and propylene. The solvent feed to the absorber is dimethyl formamide (DMF). The overhead stream from the absorber contains all of the methane in the feed, better than 98% of the ethane and propylene in the feed, but less than 1% of the acetylene which entered the absorber in the feed.

These methane, ethane, propylene and acetylene impurities are, of course, separated from the ethylene product stream in the hydrogenation section and the ethylene fractionation section of the process, as illustrated in the accompanying drawing.

The solvent solution forming the bottoms from the absorber contains more than 99% of the acetylene in the feed to the absorber, all of the solvent introduced into the absorber, substantial amounts of ethylene impurities, and lesser amounts of ethane and propylene impurities. The bottoms from the absorber pass to the first flash drum where about 75% of the ethylene impurities, about 85% of the ethane impurities and more than 80% of the propylene impurities are removed as overhead vapors. Less than 10% of the acetylene removed from the absorber in the solvent solution is flashed along with these impurities. The second flash drum flashes about one-half of the remaining ethylene, ethane and propylene impurities in its overhead stream, and substantially all of the remaining impurities are stripped from the acetylene-solvent solution in the prestripper. The overhead streams from the prestripper, the second flash drum and the first flash drum are water washed and passed to the first, second and third stages of the hydrocarbon gas compression section, respectively.

A portion of the acetylene separated from the DMF solvent in the stripper is recycled to the prestripper, and the remaining acetylene product exiting the stripper is transported to storage or consumption. This final acetylene product, both that removed for storage or consumption and that recycled to the prestripper, contains as its only impurity less than about 0.4 mol percent ethylene.

The purified DMF separated from the acetylene in the stripper is heat exchanged with the feed to the stripper and to the prestripper and then cooled to about −15° C. with liquid propylene and returned to the top of the absorbed tower for further acetylene absorption.

It can be seen from the above specific example that the process of the present invention produces both a purified ethylene product and a purified acetylene byproduct.

The invention in its broader aspects is not limited to the specific details shown and described, but departures may be made from such details within the scope of the accompanying claims without departing from the prin-

What is claimed is:
1. In a process for the production of ethylene by cracking a hydrocarbon, compressing the cracked gas products in at least two stages with the pressure being increased in each of the succeeding stages of compression, fractionating the compressed, cracked gases to separate a fraction of the product comprising a major portion of ethylene and a minor portion of acetylene, and separating the acetylene from said ethylene to produce a purified ethylene product and a purified acetylene byproduct; the improvement which comprises separating the acetylene from the ethylene by:
  (a) bringing an acetylene-selective solvent into intimate contact with the ethylene-acetylene mixture at an elevated pressure to dissolve and remove substantially all of the acetylene from the ethylene-acetylene mixture in an acetylene-solvent solution containing a minor amount of ethylene as an impurity, the remainder of the ethylene from said mixture being isolated in a purified form;
  (b) removing ethylene impurities from the acetylene-solvent solution by subjecting the solution to at least two stages of flash evaporation, the pressure of the acetylene-solvent solution being reduced in each succeeding flash stage, with the pressure applied to said solution in each of the flash stages being at least as great as the entry pressure of one of the stages of compression of the hydrocarbon gases in the compression step of the ethylene production process;
  (c) stripping the acetylene from the remaining ethylene-free acetylene-solvent solution, isolating the purified acetylene, and recycling the substantially pure solvent residue for additional acetylene-absorption; and
  (d) mixing the flashed ethylene from each stage of flash evaporation with the cracked hydrocarbon gas stream in the compression step of the ethylene production process.

2. The process of claim 1 in which the acetylene-solvent solution leaving the last stage of flash evaporation is further treated for the removal of ethylene impurities prior to the stripping of the acetylene from said solution by contacting the solution at about atmospheric pressure with sufficient heat or pure acetylene to prestrip any residual ethylene from said solution in a gaseous form; the gaseous ethylene evolved in said prestripping being pressurized to a pressure at least as great as the entry pressure of the first stage of the compression step of the ethylene production process and mixed with the hydrocarbon gas stream entering said first compression stage.

3. The process of claim 2 in which there are at least three stages of compression of the cracked hydrocarbon gases, and in which there are two stages of flash evaporation; the first flash stage operating at a pressure at least as great as the entry pressure to the third stage of said compression, with the ethylene evolved in said first stage of flash evaporation being mixed with cracked hydrocarbon gas stream entering said third stage of compression; and the second flash stage operating at a pressure at least as great as the entry pressure to the second stage of compression, with the ethylene evolved in said second stage of flash evaporation being mixed with the cracked hydrocarbon gas stream entering said second stage of compression.

4. The process of claim 2 in which the ethylene streams evolved from each stage of flash evaporation and from the prestripping step are washed with water to remove entrained solvent before said streams are mixed with the cracked hydrocarbon gas streams.

5. The process of claim 2 in which the ethylene prestripping is carried out by heating the acetylene-solvent solution and concurrently contacting the solution with purified acetylene.

6. The process of claim 1 in which the solvent is presaturated with gaseous ethylene and cooled to temperatures not greater than about −15° C. before it is brought into contact with the ethylene-acetylene mixture.

7. The process of claim 1 in which the purified ethylene isolated by the solvent treatment of the ethylene-acetylene mixture is subjected to hydrogenation to ensure that such purified ethylene is entirely free of acetylene.

8. The process of claim 7 in which the purified ethylene gas stream from the solvent treatment step is brought into intimate contact with liquid ethylene to remove entrained solvent before it is subjected to hydrogenation.

9. The process of claim 1 in which the substantially pure solvent residue of the stripping step is heat exchanged with the acetylene-solvent solution passing to the prestripping step, cooled to a temperature not greater than about −15° C., saturated with ethylene, and again brought into contact with a gaseous ethylene-acetylene mixture.

10. The process of claim 1 in which the solvent is dimethyl formamide.

References Cited
UNITED STATES PATENTS

| | | | |
|---|---|---|---|
| 2,250,925 | 7/1941 | Babcock | 260—679 |
| 2,805,733 | 9/1957 | Stanton | 260—679 |
| 2,830,677 | 4/1958 | Coberly | 260—679 |
| 2,886,612 | 5/1959 | McIntire | 260—679 |
| 2,942,042 | 6/1960 | Folz | 260—677 |
| 3,153,679 | 10/1964 | Rottmayr | 260—677 |

DELBERT E. GANTZ, Primary Examiner

C. E. SPRESSER, JR., Assistant Examiner

U.S. Cl. X.R.

55—64; 260—677, 679

PO-1050
(5/69)

UNITED STATES PATENT OFFICE
CERTIFICATE OF CORRECTION

Patent No. 3,530,199      Dated September 22, 1970

Inventor(s) Edgar G. Lowrance

It is certified that error appears in the above-identified patent and that said Letters Patent are hereby corrected as shown below:

Column 1, line 49, "selection" should read - - selective - -.
Column 2, line 12, "though" should read - - through - -.
Column 5, line 20, correct the spelling of "propylene". Column 6, line 6, "drum" should read - - drums - -. Column 7, line 31, after "72" insert - - is preferably heat exchanged with the feed to stripper 72 - -; same line, "is" should read - - in - -. In Table 1 spanning columns 7 and 8, in column 1 correct the spelling of "Ethane"; the total of the last column should read - - 12.50 - -. Column 8, lines 68-69, "absorbed" should read - - absorber - -.

SIGNED AND
SEALED
DEC 22 1970

(SEAL)
Attest:

Edward M. Fletcher, Jr.
Attesting Officer

WILLIAM E. SCHUYLER, JR.
Commissioner of Patents